Oct. 14, 1969  JIRO CHIBA ETAL  3,472,281
SERVO VALVE CAPABLE OF EFFECTING QUICK FEED OPERATION
Filed Dec. 15, 1966  3 Sheets-Sheet 3

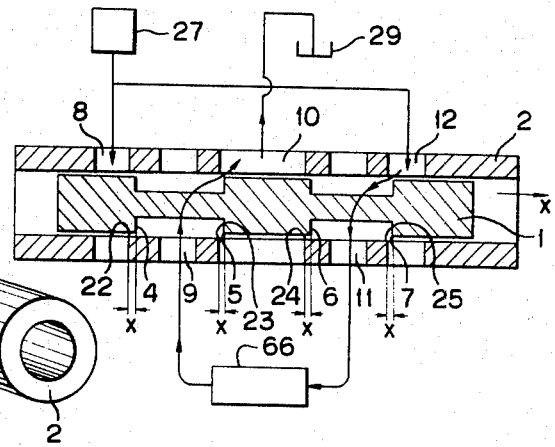
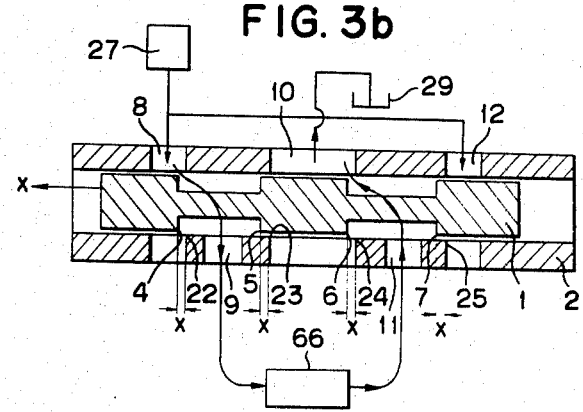
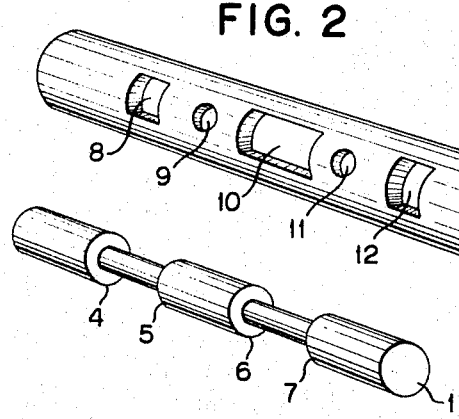
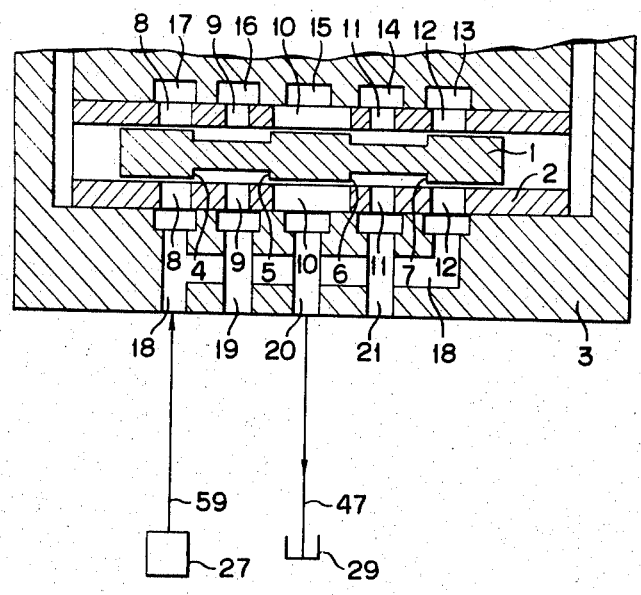

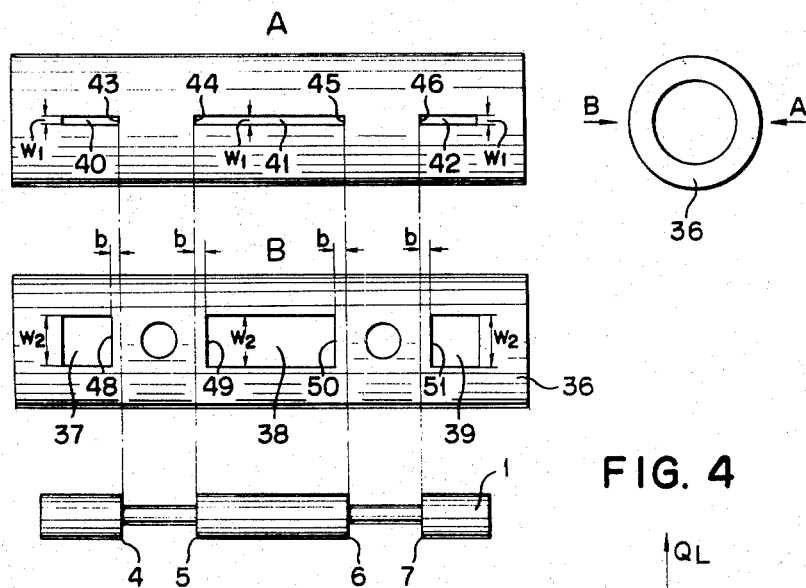
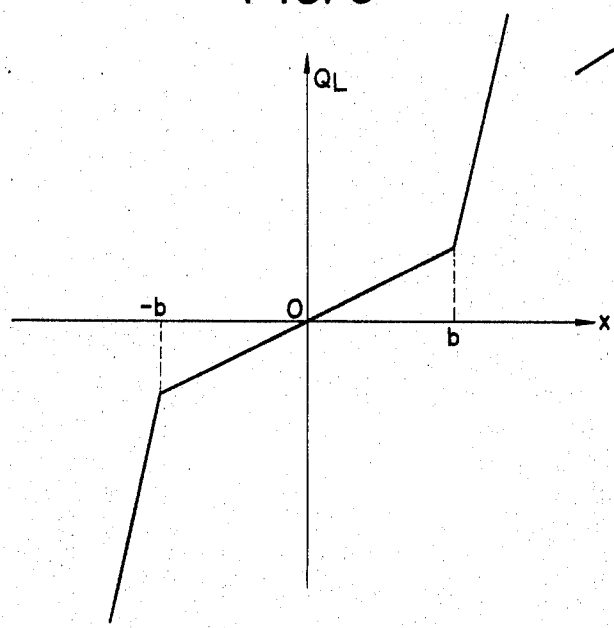

3,472,281
SERVO VALVE CAPABLE OF EFFECTING QUICK
FEED OPERATION
Jiro Chiba, Yokohama-shi, Ikuo Takahashi, Chigasaki-shi, and Yasuhiro Hasegawa, Tokyo, Japan, assignors to Tokyo Seimitsu Sokki Kabushiki Kaisha, Kawasaki-shi, Kanagawa-ken, Japan
Filed Dec. 15, 1966, Ser. No. 601,900
Claims priority, application Japan, Jan. 14, 1966, 41/1,820
Int. Cl. F16k 11/07
U.S. Cl. 137—625.69                    2 Claims

ABSTRACT OF THE DISCLOSURE

A servo valve for effecting quick feed as well as control, the valve having a sleeve with ports therein. In one embodiment, the ports connected to the inlets to the valve have a control portion extending along the sleeve parallel to the axis thereof and of a much smaller circumferential dimension than the remainder of the port, which control portion is uncovered by the land on the valve spool before the rest of the port. In another embodiment, there are two groups of ports in the sleeve, one being relatively large ports for passing a quick feed amount of fluid, and the other being long narrow ports, longer than the ports of the one group, but smaller in the circumferential dimension. The long narrow ports are first opened by the lands to feed a control amount of fluid, and thereafter the larger ports are opened.

---

The present invention relates to an electrically operated flow control servo valve (hereinafter to be referred to simply as servo valve) for use in tooling machines and other hydraulically controlling devices, and more particularly to a servo valve which, because of its sleeve being locally formed into a specific shape, is capable of both accomplishing high precision control which is the primary object of servo valves and effecting quick feed of fluid before and after the controlling period.

Servo valves have been used as an electrically operated hydraulic pressure changing element for the control of continuous positioning in tooling machines or like apparatuses. Servo valves for use in such control operations have been designed, with importance being placed on its action at the time of controlling, so that it has a characteristic (which is determined by the angle $\theta$ in FIG. 4) optimum for effecting the control. As a consequence, when quick feed is required, it has been the usual practice to provide a separate solenoid-operated valve to apply a large quantity of high pressure fluid to the load driving actuator (hereinafter to be referred to simply as actuator) or as an alternative technique, to use a clutch or like means in case a rotary actuator is employed so as to alter the gear ratio to drive the actuator at a high speed.

It is the primary object of the present invention to provide a servo valve by which not only an output flow rate which is adequate for the controlling operation is obtained but also an intensive flow rate for quick feed is available by the use of a valve in which either the sleeve or the spool having such a specific configuration as will be described is employed or by the use of the valve in which both the sleeve and the spool having such specific configurations are mounted.

Another object of the present invention is to provide a servo valve which is capable of causing the load to effect quick feed without requiring any additional specific quick feed mechanism and which, accordingly, simplifies the structure of machines requiring quick feed operation, and which reduces the possibility of occurrence of disorders in such machines.

Other objects and advantages of the present invention will become apparent by reading the following detailed description with reference to the accompanying drawings in which:

FIG. 1 is a longitudinal cross sectional view showing the guide valve section of a conventional electrically operated oil pressure servo valve (hereinafter to be referred to simply as servovalve) designed to control the fluid flow rate;

FIG. 2 represents perspective views of a spool and a sleeve which are the principal constitutional elements of the guide valve section of a servo valve of the prior type;

Figure 8A:
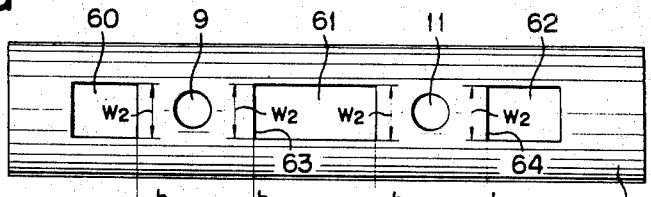
Figure 8B:
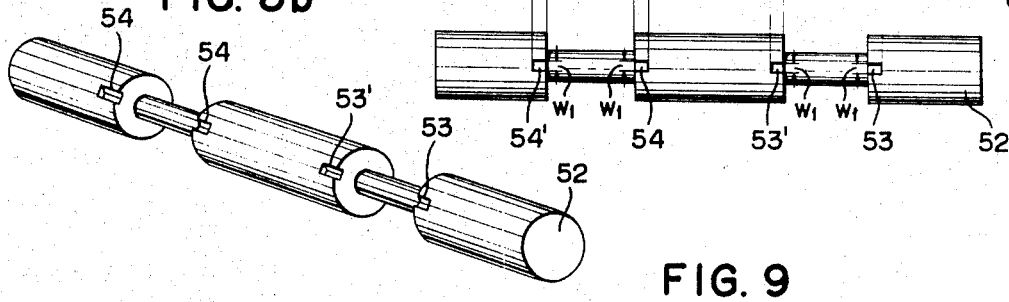
Figure 9:
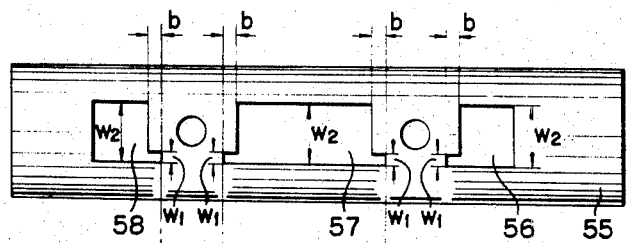
Figure 5A:
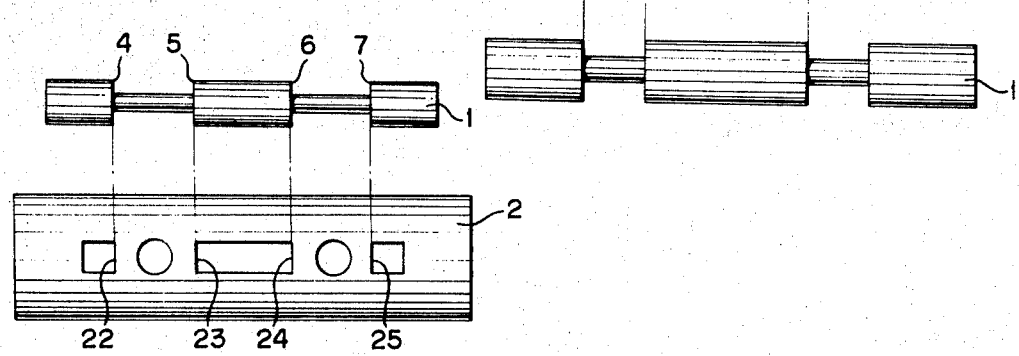
Figure 5B:
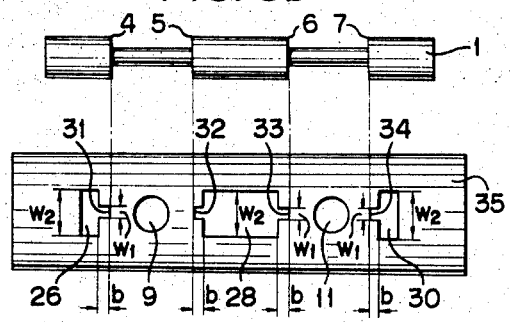

FIG. 3-a and FIG. 3-b are illustrations to explain the manner in which the relative positions of the conventional spool and sleeve as a unit assembly are displaced to thereby control the flow rate of fluid;

FIG. 4 is a diagram showing a no-load flow rate characteristic curve of a conventional servo valve;

FIG. 5-a and FIG. 5-b are illustrations for comparative explanation of a conventional spool-sleeve as against the spool-sleeve assembly of one of the embodiments of the present invention;

FIG. 6 is a diagram showing a no-load flow rate characteristic of a servo valve employing the spool-sleeve assembly of one embodiment of the present invention;

FIG. 7 is another embodiment which is different from the one shown in FIG. 5-b;

FIG. 8-a and FIG. 8-b show still another embodiment of the present invention which is different from the ones illustrated in FIG. 5-b and FIG. 7, said FIG. 8-b being a perspective view of the spool in FIG. 8-a; and FIG. 9 shows still another embodiment of the present invention which is different from those shown in FIG. 5-b, FIG. 7, FIG. 8-a and FIG. 8-b.

The present invention will now be described by referring to the drawings.

FIG. 1 is a cross sectional representation showing the guide valve section and its vicinity in a conventional servo valve. As is well known, conventional servo valves have been designed so as to control the flow rate of the high pressure fluid which is applied to the load-driving actuator to thereby properly drive the load in such operation as the positioning and controlling of a large load. Therefore, a conventional servo valve has been formed of two principal sections, namely, a guide valve section for controlling the applied high pressure fluid by the displacement of the guide valve, and a solenoid circuit section for effecting displacement of the guide valve in response to the electrical signal. Description will hereunder be made in further detail in connection with FIG. 1. Reference numeral 1 represents a spool which is adapted to slide inside the sleeve 2 to change its own position. The sleeve 2 is fixed within a servo valve proper 3. Numeral 27 represents a high pressure fluid generating source adapted to generate high pressure fluid and to supply it through a conduit 59 to the servo valve. The servo valve controls the flow rate of the fluid supplied thereto to thereby supply a controlled rate of fluid to the load through the openings 19 and 21 which communicate with the load. The fluid which has driven the load returns to the servo valve, and therefrom it passes through a conduit 47, and is collected in a tank 29. With respect to the spool 1, the portion having a larger diameter is called a "land," while the narrow portion with a smaller diameter is called a "stem." In these three lands, the marginal edges of the portions adapted to control the flow rate of the fluid are indicated by numerals 4, 5, 6 and 7, respectively, as shown in FIG. 1.

The sleeve 2 is provided with openings, 8, 9, 10, 11, and 12 which are called generally as "ports." Of these, the openings indicated by numerals 8 and 12 will hereinafter to be referred to as the supply ports, the openings indicated by numerals 10 as the return port, and those indicated by numerals 9 and 11 as the load ports. In the servo valve proper 3, the portion located outside the sleeve 2 is provided with grooves 13, 14, 15, 16 and 17 for guiding the fluid flowing through the ports 8, 9, 10 and 11 to the openings 18, 19, 20 and 21 communicating with the load.

FIG. 2 shows the spool 1 and the sleeve 2 in their state that the spool 1 is separated from the sleeve 2 after the assembly of the spool 1 and the sleeve 2 has been removed from the servo valve proper 3. FIG. 3–a and FIG. 3–b show the manner in which the high pressure fluid is controlled by the displacement of the spool 1 to the right and to the left, respectively. In FIG. 3–a, the spool 1 is seen displaced by a distance $x$ to the right with respect to the sleeve 2, whereas in FIG. 3–b the spool 1 is seen displaced by a distance $x$ to the left relative to the sleeve 2. Now, referring particularly to FIG. 3–a, it will be noted that when the spool 1 has been displaced by a distance $x$ relative to the sleeve 2, the port 8 is closed by the land of the spool 1, while with respect to the port 10, there is created an opening indicated by the distance $x$ between the marginal edge 25 of the port 10 and the marginal edge 7 of the spool 1. As a result, the high pressure fluid produced in the high pressure fluid generating source 27 is caused to pass through the opening $x$ (hereinafter to be referred to as the control orifice) of the port 12 and, after passing through the load port 11, it causes the load driving actuator 66 to be displaced. When the load driving actuator has thus been displaced, a quantity of fluid which is the same as that applied to the actuator is caused to be discharged at the other side of the load so as to be forced to return to the tank 29 through the load port 9 and through the control orifice of the port 10. The controlled flow rate $Q_L$ of the high pressure fluid which is either applied to the load or fed back from the load is proportional to the area $a$ of the control orifice provided that the supply pressure applied to the port 8 or port 12 is constant and that there is used no load. FIG. 3–b shows the performance where the spool 1 has been displaced by a distance $x$ to the direction opposite to that in FIG. 3–a. In this second instance, the controlled flow rate $Q_L$ is proportional to the area $a$ of the control orifice created in the port 8 and also in the port 10, but the direction of the flow of the fluid under controlled flow rate is the reverse of that of FIG. 3–a. When it is assumed that the direction of the flow of the fluid under controlled flow rate in FIG. 3–a is normal or positive, the relationship between the displacement of the spool 1 and the controlled flow rate $Q_L$ assumes a rectilinear characteristic as shown in FIG. 4, wherein: in case $x=0$, then $Q_L=0$, and in case $x<0$, then $Q_L<0$. This is because the controlled flow rate $Q_L$ is proportional to the area $a$ of the control orifice, and because this area of the control orifice is proportional to the amount of displacement $x$ made by the spool provided that the circumferential width of the port is constant.

FIG. 5–a and FIG. 5–b are comparative representations of a conventional spool-sleeve assembly as against the spool-sleeve assembly of one embodiment of the present invention.

In FIG. 5–b, reference numerals 26 and 30 represent supply ports; numerals 9 and 11 represent load ports, and numeral 28 represents a return port. The inner edges 31, 32, 33 and 34 of the ports of the sleeve 35 are of dimensions such that they are in register, in position, with the marginal edges 4, 5, 6 and 7 of the spool 1, respectively. In case the sleeve 35 of the present invention is used in a servo valve, the controlled flow rate $Q_L$ will be as follows:

Provided that the supply pressure is constant, and with reference to FIG. 5–b where there is no load:

If $-b \geqq x \geqq b$, then
$$Q_L = kw_1 x \quad (1)$$
If $x > b$, then
$$Q_L = kw_1 b + kw_2(x-b) \quad (2)$$
If $x < -b$, then
$$Q_L = -kw_1 b + kw_2(x+b) \quad (3)$$

wherein $k$ represents a proportional constant.

Diagammatically the foregoing assume a no-load flow rate characteristic curve which is as shown in FIG. 6. When this curve is compared with the no-load flow rate characteristic curve of a conventional servo valve, it will be noted that $x$ has an increased gradient in the area outside the range of $\pm b$. In case the sleeve of the present invention is employed, the servo valve is then operated within the range of $-b < x < b$ shown in FIG. 6 for the controlling purpose, while when a quick feed is required, it is operated within the range of $x > b$ or $x < -b$. Also, when control is to be suspended to effect a quick feed, an electric signal for effecting a greater displacement amount $x$ than $b$, in place of a control signal, is impressed to the servo valve.

FIG. 7 is schematic representations of another embodiment of the present invention which is different from the one shown in FIG. 5–b. In FIG. 7, the openings formed on the side of the sleeve indicated by the arrow B and those formed on the side indicated by the arrow A are located on the circumference of the sleeve in opposite directions relative to the center of the axis thereof. However, such formation of the two groups of openings does not necessarily require to be made in the diametrically opposite directions of the sleeve.

The ports 40 and 42 in FIG. 7 correspond to the portion of the width $w_1$ of the port 26 and the portion of the width $w_1$ of the port 30, respectively, in FIG. 5–b. The port 41 in FIG. 7 corresponds to the portion of the width $w_1$ of the port 28 in FIG. 5–b. The marginal edges 43, 44, 45 and 46 of the ports in FIG. 7 correspond to the marginal edges 31, 32, 33 and 34, respectively, of the ports in FIG. 5–b. The marginal edges 43, 44, 45 and 46 of the ports in FIG. 5–b which represents the side indicated by the arrow B are dimensionally in agreement with the marginal edges 4, 5, 6 and 7, respectively, of the spool 1. However, there is a discrepancy by the distance $b$ in the positions between the marginal edges 48, 49 and 50 and the respective marginal edges of the sleeve 36 and the spool 1. The no-load flow rate $Q_L$ of the servo valve comprising the combination of the sleeve 36 and the spool 1 is as follows.

Provided that the supply pressure is constant and that there is no load,

If $-b \leqq x \leqq b$, then
$$Q_L = kw_1 x \quad (4)$$
If $x > b$, then
$$Q_L = kw_1 x + kw_2(x-b) \quad (5)$$
If $x < -b$, then
$$Q_L = kw_1 x + kw_2(x+b) \quad (6)$$

wherein $k$ represents a proportional constant.

The Formulas 4, 5 and 6 are substantially the same with the aforesaid Formulas 1, 2 and 3, and the no-load flow rate characteristic is as shown in FIG. 6.

FIG. 8–a and FIG. 8–b represent another embodiment of the present invention which is different from those shown in FIG. 5–b and FIG. 7. In this instance, the sleeve 65 is the same with the sleeve of a conventional servo valve which has been shown as the sleeve 2 in FIG. 5–a, and has a port of oblong shape, but notches are formed in the spool. The flow rate characteristic of this valve is as shown in FIG. 6, being the same in characteristic as that of FIG. 5–b or FIG. 7. Specifically, under a predetermined same supply pressure, If $-b \leqq x \leqq b$ then
$$Q_L = kw_1 x \qquad (7)$$
If $x > b$, then
$$Q_L = kw_1 b + kw_2(x-b) \qquad (8)$$
If $x < -b$, then
$$Q_L = -kw_1 b + kw_2(x+b) \qquad (9)$$
wherein $k$ represents a proportional constant.

The performance obtained from the combination of the sleeve 65 and the spool 52 in FIG. 8–a is as follows. When the spool 52 has been displaced by a distance $x$ to the right, the high pressure fluid applied to the port 62 is controlled of its flow rate by the control orifice which is surrounded by the marginal edge 64 of the port 62, the marginal edge 53 of the notch and the width $w_1$ of the notch, and the controlled fluid passes through the port 11 and reaches the load actuator, while the fluid discharged from the opposite side of the actuator returns to the port 9. This fluid is then controlled of its flow rate by the control orifice which is surrounded by the marginal edge 63 of the port 61, the marginal edge 54 of the spool 52 and the width $w_1$ of the notch of said spool 52 before being returned through the port 61 to the tank 29. When the distance $x$ of the displacement has surpassed the extent of $b$, then the control orifice assumes a convex shape.

FIG. 9 represents still another embodiment which is different from those shown in FIG. 5–b, FIG. 7, FIG. 8–a and FIG. 8–b. In this instance, the spool 1 is the same as the spool of the conventional servo valve. The sleeve 55 incorporates the present invention. While in the embodiment of FIG. 5–b, the portions of the widths $w_1$ of the ports 56, 57 and 58 are noted to be located in the central area of each port, the embodiment of FIG. 9 is different from that of FIG. 5–b in that the notch is formed at the corner of each port. The no-load flow rate characteristic of the servo valve employing the sleeve 55, is as shown in FIG. 6, like those of the other embodiments.

The present invention provides, in a servo valve comprising a sleeve having ports for controlling the flow rate as has been described and a spool and being operative for controlling the effective areas of opening of said ports by the sliding movement of the spool within the sleeve, an arrangement to effect a two-step change in the effective area of opening (the area of the control orifice) of said ports being formed in the sleeve which is caused by the displacement of the spool, either by having the circumferential widths of said ports of the sleeve to effect a change in two steps in the direction of the displacement of the spool, or by the provision of notches at the controlling marginal edges of the spool which undertakes the opening and closing of the ports. As a consequence, the use of the servo valves of the present invention permits one to obtain both the output flow rate suitable for controlling purpose and an intensive flow rate for quick feed purpose to thereby cause the load to perform quick feed operation, without requiring any additional specific quick feed mechanism, and thus the present invention simplifies the structure of the machines requiring both the controlling and quick feed operations.

What is claimed is:

1. A servo valve for effecting quick feed in addition to control, said valve comprising a valve body having inlet and outlet ports therein and a bore having circumferential grooves therearound, the grooves being in communication with the respective ports, a sleeve in said bore having two pluralities of ports therein, said pluralities being at different circumferential positions on said sleeve and the individual ports of said pluralities being aligned with said circumferential grooves, the first plurality being control ports and having a greater dimension parallel to the axis of the sleeve and a smaller circumferential dimension than the second plurality of ports, the second plurality being quick feed ports and having a smaller axial dimension and a greater circumferential dimension than said first plurality, sleeve discharge ports between adjacent ports in at least one plurality of sleeve ports and a spool slidable in said sleeve and having land portions spaced along the spool at distances slightly less than the spacing of adjacent control ports and having stem portions between said land portions through which the sleeve ports at corresponding axial positions and adjacent sleeve discharge ports are in communication when said stem portions overlap adjacent ports, whereby when a land portion moves along the sleeve, the control ports are opened first to pass a control amount of fluid into the stem portion of the spool and thereafter the quick feed ports can be opened to pass a quick acting amount of fluid into the stem portion of the spool by further movement of the spool.

2. A servo valve as claimed in claim 1 in which the ports of the first plurality of ports are diametrically opposite the ports of the second plurality of ports in the sleeve.

References Cited
UNITED STATES PATENTS

| | | | |
|---|---|---|---|
| 1,307,821 | 6/1919 | Kiesel | 137—625.69 |
| 2,209,418 | 7/1940 | Overbeke | 137—625.69 |
| 2,391,531 | 12/1945 | Warren | 251—282 |
| 3,354,912 | 11/1967 | Gordon et al. | 137—625.69 |
| 3,047,018 | 7/1962 | Lucien | 137—625.69 |
| 2,526,361 | 10/1950 | Johnson | 137—625.66 |
| 423,105 | 3/1890 | Allen | 137—625.68 |
| 2,919,681 | 1/1960 | Schultz | 137—625.69 |
| 3,152,610 | 10/1964 | McAfee | 137—625.69 XR |
| 3,160,174 | 12/1964 | Schmiel et al. | 137—625.69 XR |

FOREIGN PATENTS

| | | |
|---|---|---|
| 4,024 | 3/1891 | Great Britain. |
| 401,937 | 8/1909 | France. |
| 1,108,630 | 6/1961 | Germany. |

HENRY T. KLINKSIEK, Primary Examiner

U.S. Cl. X.R.

251—205